United States Patent [19]

Karita

[11] Patent Number: 4,700,119
[45] Date of Patent: Oct. 13, 1987

[54] APPARATUS FOR POSITIONING CARRIAGE IN AUTOMATIC TRANSPORTATION SYSTEM

[75] Inventor: Mitsuji Karita, Mie, Japan
[73] Assignee: Shinko Electric Co., Ltd., Tokyo, Japan
[21] Appl. No.: 882,162
[22] Filed: Jul. 7, 1986
[51] Int. Cl.$^4$ .............................................. B64C 13/18
[52] U.S. Cl. .................................. 318/587; 318/567; 318/687; 318/135
[58] Field of Search ............... 318/567, 687, 135, 587; 250/237 G, 231 SE

[56] References Cited

U.S. PATENT DOCUMENTS

| 3,904,942 | 9/1975 | Holtz | 318/687 X |
| 4,041,483 | 8/1977 | Groff | 340/347 P |
| 4,367,435 | 1/1983 | Bailey et al. | 318/313 |
| 4,404,671 | 9/1983 | Kuribayashi | 318/687 X |

Primary Examiner—William M. Shoop, Jr.
Assistant Examiner—Saul M. Bergmann
Attorney, Agent, or Firm—Welsh & Katz, Ltd.

[57] ABSTRACT

An apparatus for positioning a carriage of an automatic transportation system is provided. At least a pair of magnetic cores spaced from each other in the direction of traveling of the carriage are mounted on a floor at a predetermined position within a stop zone on a track of the carriage. A yoke is mounted on a lower surface of the carriage which is disposed within a magnetic field generated by the magnetic cores when the carriage is within the stop zone. A plurality of reflection plates are mounted on the carriage and are equally spaced from one another in the direction of traveling of the carriage. A pair of reflection-type photosensors are mounted on the floor within the stop zone and output a pair of pulse trains 90° out of phase from each other when the carriage moves within the stop zone. Pulses of the pulse trains are counted taking the direction of movement of the carriage into account to produce data representative of deviation of the carriage from a predetermined stop position. Induction coils wound around the magnetic cores are excited in accordance with the data so that the carriage is moved to the predetermined stop position.

6 Claims, 9 Drawing Figures

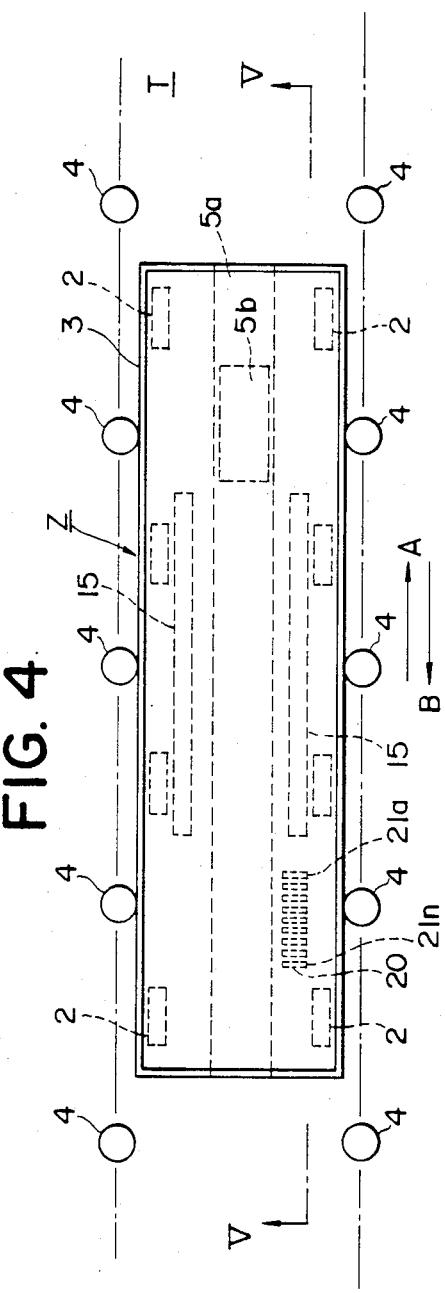
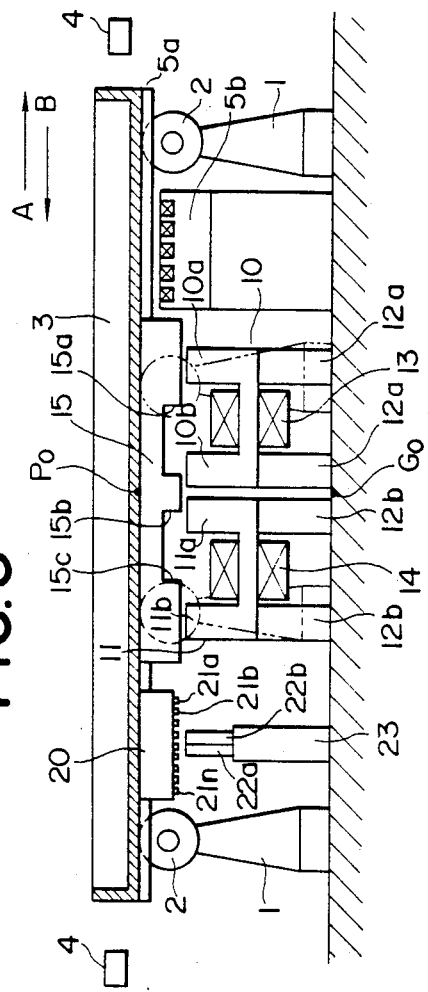

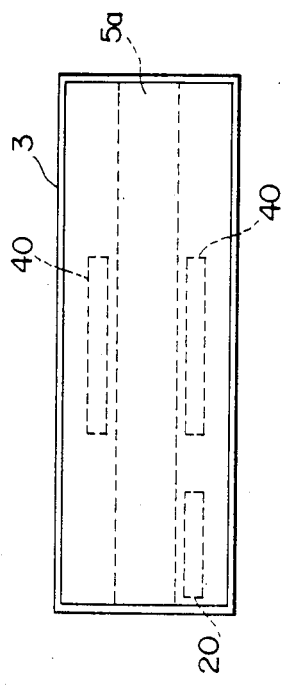
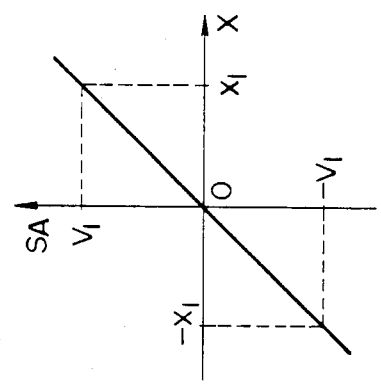
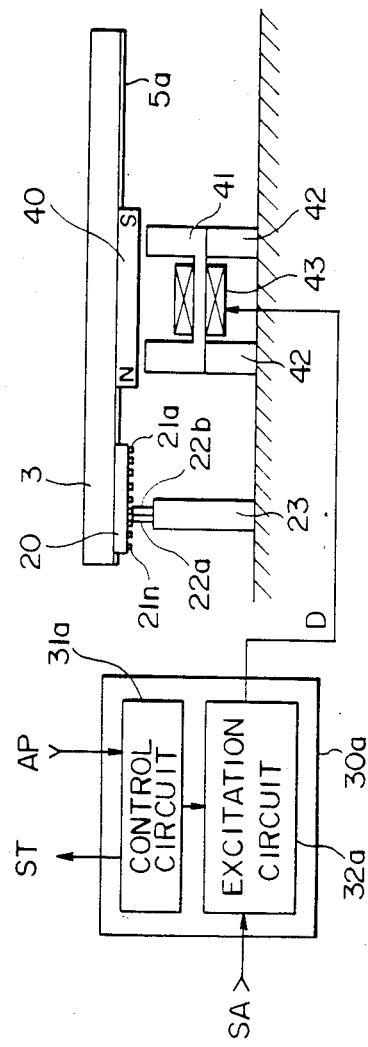
FIG. 7
FIG. 8
FIG. 9

APPARATUS FOR POSITIONING CARRIAGE IN AUTOMATIC TRANSPORTATION SYSTEM

BACKGROUND OF THE INVENTION

1. Field of the Invention

This invention relates generally to an automatic transportation system for transporting materials in factories, warehouses or the like, and more particularly to an apparatus for positioning a carriage in such an automatic transportation system.

2. Prior Art

There has been proposed an automatic transportation system for transporting materials for an assembly line in a factory which comprises a carriage or a pallet propelled by a linear induction motor (hereinafter referred to as "LIM"). Such as automatic transportation system includes a free-roller conveyor laid on a floor, a plurality of stators of the LIM mounted on the floor along the free-roller conveyor, and a carriage (or a pallet) placed on the free-roller conveyor for slidable movement and provided at its bottom surface with a secondary conductor which serves as a reaction plate of the LIM. The stators are suitably energized to move the carriage to a predetermined position or station to thereby transport goods placed on the carriage.

With such an automatic transportation system as described above, to stop the moving carriage, the stators are energized by opposite-phase currents to brake the carriage. It is, however, difficult to stop the carriage accurately at a desired position only by the braking operation due to the opposite-phase currents. For this reason, the conventional automatic transportation system of this kind is provided with a positioning apparatus which produces, after the speed of the carriage is sufficiently decreased by the opposite-phase currents, a magnetic attractive force to stop the carriage precisely at predetermined positions.

FIGS. 1 and 2 show the structure of the conventional automatic transportation system with such positioning apparatus. The system comprises two rows of roller supports 1 mounted on the floor, each row of roller supports being spaced by a predetermined distance from one another along a path or a track T. The roller supports 1 are provided at their tops with rollers 2, respectively, which are disposed at the same level above the floor. Placed on the rollers 2 for slidable movement is a carriage 3 on which goods to be transported are placed. Also provided along the track T at the sides thereof are guide rollers 4 which rollingly engage with side faces of the carriage 3 and prevent the carriage 3 from moving transversely of the track T. The carriage 3 has at a bottom surface thereof a reaction plate 5a of a LIM in the form of an elongated plate made of conductive materials. A plurality of stators 5b are mounted on the floor along the track T at equal intervals in such a manner that a top surface of each stator 5b faces a lower surface of the reaction plate 5a when the carriage 3 passes past the stator 5b. A pair of yokes 6a each having an E-shaped cross-section are fixedly mounted on the carriage 3 at its lower surface in such a manner that leg portions thereof extend downward, the yokes 6a being spaced from each other transversely of the carriage 3. A pair of yokes 6b each having an E-shaped cross-section are mounted on the floor at each predetermined stop position of the carriage 3 with their leg portions extending upward. In this case, end faces of the leg portions of the yokes 6b face those of the yokes 6a when the carriage 3 is disposed at the stop position. An induction coil 6c is wound around the center leg of each of the yokes 6b. In this automatic transportation system, the yokes 6a, the yokes 6b and the coils 6c constitute a positioning apparatus 6 for this automatic transportation system.

With this conventional system, the carriage 3 running at a high speed in the forward direction indicated by an arrow A in FIG. 1 along the track T is braked by a traveling magnetic field produced by the stator 5b in the reverse direction indicated by an arrow B, and approaches the stop position shown in FIG. 1 at a decreased speed. Then, when the arrival of the carriage 3 at the stop position is detected by means of a limit switch (not shown), the stator 5b is de-energized and at the same time the coil 6c of the positioning apparatus 6 is energized. As a result, a magnetic attractive force is exerted between the yokes 6a and the yokes 6b, so that the carriage 3 is positioned at the stop position with the top faces of the leg portions of the yokes 6b facing the bottom faces of the leg portions of the yokes 6a. In this case, a centripetal force P to decrease the deviation of the yokes 6a from the yokes 6b is exerted in the yokes 6a. The magnitude of this centripetal force P varies, as shown in FIG. 3, in accordance with the amount of deviation X of the yokes 6a from the yokes 6b. As will be appreciated from FIG. 3, on condition that the deviation X is within a specific range L shown in FIG. 3, the greater the absolute value of the deviation X becomes, the greater the centripetal force P to decease the deviation X becomes, and the centripetal force P is rendered zero when the deviation X is zero.

With the above system, however, if there exists a friction force between the carriage 3 and the track T, the carriage 3 suffers from a non-negligible positioning error. For example, if a friction force M (FIG. 3) to suppress the rotation of the rollers 2 is exerted in the bearings of the rollers 2, the carriage 3 is subject to a positioning error of within the range of $\pm 1/2$ determined by the magnitude of the friction force M, since the centripetal force P becomes smaller than the friction force M within the range of $\pm 1/2$. Thus, the greater the friction force M is, the greater the positioning error of the carriage 3 becomes. The above-described conventional system is thus deficient in that the positioning error of the carriage 3 is not negligible and varies in accordance with the variation of the friction force M due to the aged-deterioration of the bearings and other components parts.

SUMMARY OF THE INVENTION

It is therefore an object of the present invention to provide a positioning apparatus for a carriage in an automatic transportation system which can stop the carriage with little positioning error due to friction forces between the carriage and a track.

It is another object of the invention to provide a positioning apparatus which can position a carriage at a predetermined stop position accurately and stably.

According to the present invention, there is provided an apparatus for positioning a carriage in an automatic transportation system comprising first magnetic device means mounted on a floor at a predetermined position of each of stop zones on a track for generating a variable magnetic field; second magnetic device means mounted on the carriage and driven by the magnetic field generated by the first magnetic device means to move the carriage along the track in the direction determined by the magnetic field when the carriage is disposed within a selected one of the stop zones; detector means for detecting deviation of the carriage from the predetermined stop position within the stop zones to output a detection signal representative of the detected deviation; and control circuit means responsive to the detection signal for causing the first magnetic device means to vary the magnetic field so as to move the carriage along the track in such a direction that the deviation reaches zero.

BRIEF DESCRIPTION OF THE DRAWINGS

FIG. 4 is a plan view of an automatic transportation system provided with a positioning apparatus according to the present invention;

FIG. 5 is a cross-sectional view of the automatic transportation system of FIG. 4 taken along the line V—V of FIG. 4;

FIG. 7 is an illustration showing the relationship between the voltage of the signal SA and the displacement X of the yokes 15 relative to the cores 10 and 11;

FIG. 8 is a plan view of an automatic transportation system provided with a modified positioning apparatusk; and FIG. 9 is a side elevational view of the system of FIG.

DESCRIPTION OF THE PREFERRED EMBODIMENTS OF THE INVENTION

Figure 1:
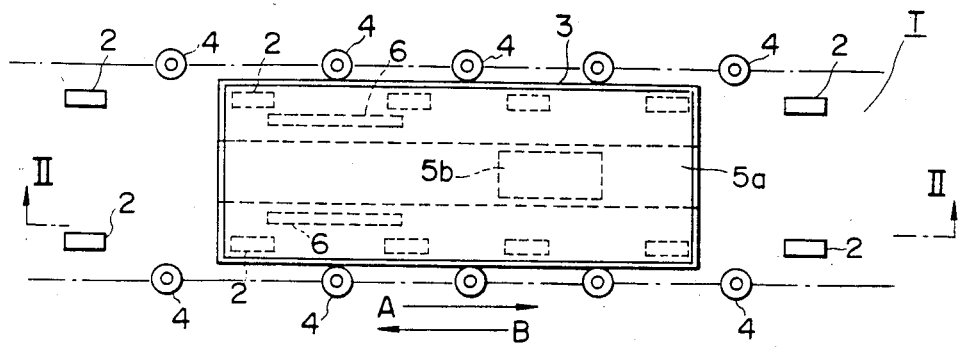
FIG. 1 is a plan view of an automatic transportation system with a conventional positioning apparatus.
Figure 2:
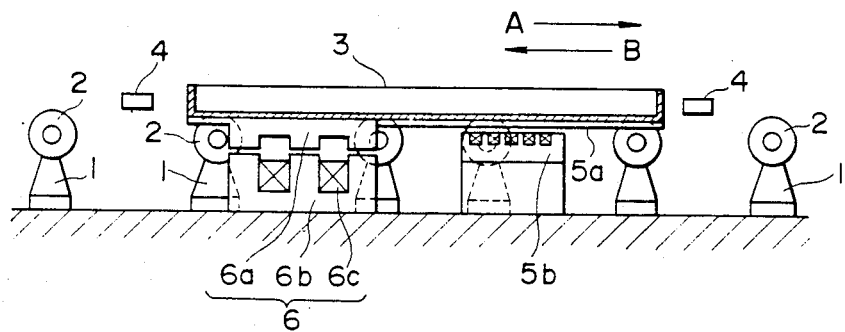
FIG. 2 is a cross-sectional view of the system of FIG. 1 taken along the line II—II of FIG. 1.
Figure 3:
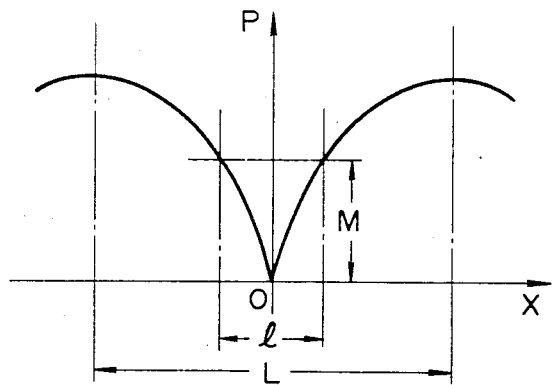
FIG. 3 is an illustration showing the relationship between a centripetal force P produced by the positioning apparatus of the system of FIG. 1 and a deviation X of the yokes 6a from the yokes 6b.

Referring now the FIGS. 4 and 5, there is shown an automatic transportation system with a positioning apparatus provided in accordance with the present invention. This automatic transportation system is similar in construction to the conventional system shown in FIGS. 1 and 2, and comprises roller supports 1, rollers 2, a carriage 3, guide rollers 4 and a LIM including a reaction plate 5a and stators 5b. In FIGS. 4 and 5, arrows A and B respectively indicate the forward direction and the backward direction of traveling of the carriage 3. Shown at 10 are magnetic cores each having a U-shaped cross-section which are fixedly mounted on the floor through support members 12a with leg portions 10a thereof extending upward. The magnetic cores 10 are disposed at predetermined positions in each stop zone Z of the carriage 3, and are spaced by a predetermined distance transversely of the track T or the path of the carriage 3. An induction coil 13 is wound around a base portion of each of the magnetic cores 10. Another pari of magnetic cores 11 similar in construction to the cores 10 are also fixedly mounted on the floor through support members 12b. An induction coil 14 is wound around a base portion of each of the cores 11. The cores 11 are also spaced from each other transversely of the track T. The cores 10 and 11 on one side of the track T are in alignment with each other in the longitudinal direction of the track T. Similarly, the cores 10 and 11 on the other side of the track T are in alignment with each other in the longitudinal direction of the track T. And, a predetermined gap is provided between the cores 10 and 11 on each side of the track T. In this case, the cores 10 and 11 on each side of the track T are symmetrically disposed with respect to a plane perpendicular to the longitudinal direction of the track T and passing through a reference point $G_0$ on the floor above which the carriage 3 should be positioned. A pair of yokes 15 of an E-shaped cross-section and made of magnetic material are secured to a lower surface of the carriage 3 at the central portion thereof with their leg portions 15a to 15c extending downward. The width of each of the leg portions 15a and 15c of the yokes 15 in the longitudinal direction of the track T is greater than that of the leg portion 15b. In this case, the centers of the yokes 15 are disposed in the same plane which is perpendicular to the longitudinal direction of the track T and passes through a reference point $P_0$ on the carriage 3. The reference point $P_0$ is so determined that it comes just above the reference point $G_0$ when the carriage 3 is stopped precisely at the predetermined stop position. An elongated member 20 of a rectangular cross-section is secured to the lower surface of the carriage 3 rearwardly of the right-hand yoke 15 so that it extends along the direction of movement of the carriage 3. A plurality of rectangular reflector plates 21a to 21n are attached to the lower surface of the member 20 in parallel relation to one another and are closely spaced from one another by a predetermined distance. The plurality of reflector plates 21a to 21n are extending transversely of the carriage 3. A pair of reflection-type photosensor units 22a and 22b, each composed of a light-emitting diode and a phototransistor, are mounted on the floor within the zone Z through a supporting member 23 rearwardly of the magnetic cores 11 in the direction of traveling of the carriage 3 along the track T. The photosensor units 22a and 22b are so disposed that sensor surface thereof are directed to the center portion of the lower surface of the member 20 when the carriage 3 is located at the predetermined stop position, and that they output a pair of pulse trains AP and BP 90° out of phase from each other in response to lights reflected by the reflector plates 21a to 21n when the member 20 with the reflector plates 21a to 21n passes thereabove.

Figure 6:
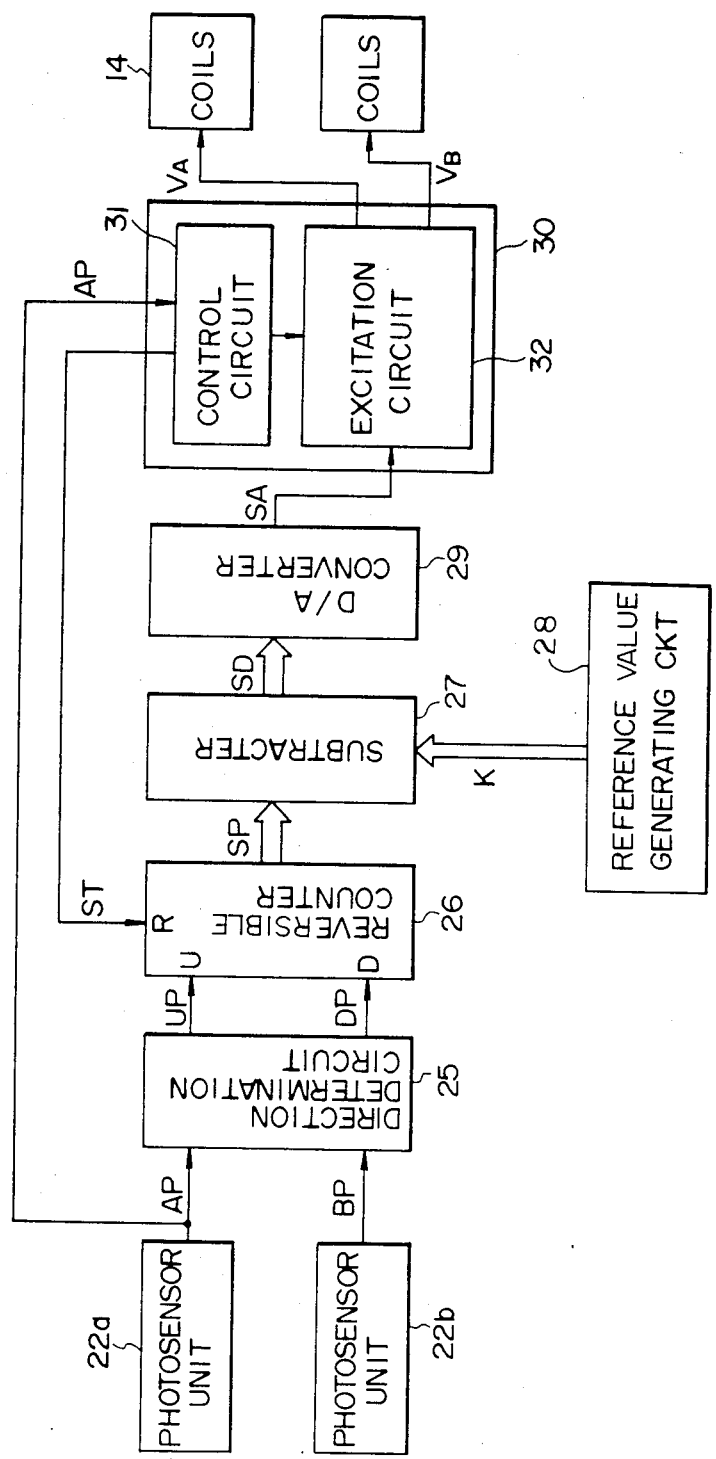
FIG. 6 is a block diagram of a control unit of the positioning apparatus of the system of FIG. 4.

FIG. 6 shows a control unit of the positioning apparatus of this automatic transportation system. The A-phase and B-phase pulse trains AP and BP outputted respectively from the photosensor units 22a and 22b when the reflector plates pass thereabove are supplied to a direction determination circuit 25. The direction determination circuit 25 determines the direction of traveling of the carriage 3 based on the phase difference between the A-phase and B-phase pulse trains. More specifically, if the A-phase pulse train AP is advanced in phase than the B-phase pulse train BP, the direction determination circuit 25 determines that the cariage 3 is traveling in the forward direction indicated by the arrow A in FIG. 5, and outputs a pulse signal UP in the form of a pulse train which is identical in pulse number to the A-phase pulse train AP. On the other hand, if the A-phase pulse train AP is delayed in phase from the B-phase pulse train BP, the direction determination circuit 25 determines that the carriage 3 is traveling in the backward direction indicated by the arrow B in FIG. 5, and outputs a pulse signal DP in the form of a pulse train which is identical in pulse number to the B-phase pulse train BP. Such direction determination circuit 25 is well known in the art, and therefore the detailed construction thereof will not be described. The pulse signal UP and the pulse signal DP thus outputted from the direction determination circuit 25 are supplied respectively to input terminals U and D of a reversible counter 26. This reversible counter 26 up-counts the pulses of the pulse signal UP and down-counts the pulses of the pulse signal DP. The reversible counter 26 outputs a count value SP representative of the result of counting of the pulses of the pulse signals UP and DP to a subtracter 27. In this case, the count value SP indicates the amount of movement of the carriage 3 after the detection of the light reflected by the reflector plate 21a to the photosensor unit 22a. A reference numerical value generating circuit 28 generates reference numerical values K representing predetermined stop positions. The subtractor 27 subtracts one such reference numerical value from the count value SP, and outputs the subtraction result SD to a digital-to-analog converter (hereinafter referred to as "D/A converter") 29. The reference value K is set to a value which is equal to the count value SP obtained when the carriage 3 is positioned at the predetermined stop position, that is, when the reference point $P_0$ on the carriage 3 comes just above the reference point $G_0$ on the floor. The reference value generating circuit 28 is so designed that the reference value K can be changed if necessary. The D/A converter 29 converts the data SD fed from the subtractor 27 into an analog voltage signal SA which is supplied to an excitation control circuit 30. The voltage of the signal SA varies, as shown in FIG. 7, in accordance with the amount of displacement X of the yoke 15 relative to the cores 10 and 11, that is, in accordance with the deviation of the reference point $P_0$ on the carraige 3 from the reference point $G_0$ on the floor in the direction of movement of the carriage 3. More specifically, when the carriage 3 stops in such a position that the reference point $P_0$ comes just above the reference point $G_0$, the voltage of the signal SA becomes "0". When the reference point $P_0$ is deviated from the point $G_0$ by a distance $X_1$ in the forward direction indicated by the arrow A in FIG. 5, the voltage of the signal SA becomes $+V_1$ as shown in FIG. 7. And when the reference point $P_0$ is deviated from the point $G_0$ by the distance $X_1$ in the backward direction indicated by the arrow B in FIG. 5, the voltage of the signal SA becomes $-V_1$ as shown in FIG. 7. The excitation control circuit 30 comprises a control circuit 31 and an excitation circuit 32. The control circuit 31 is responsive to the first or leading pulse of the pulse train AP to output a pulse signal ST to a reset terminal R of the reversible counter 26 and to enable the excitation circuit 32 to operate. The excitation circuit 32 is disabled from operation in response to a start signal (not shown) for causing the carriage 3 to travel to the next station. When enabled, the excitation circuit 32 produces and controls voltages $V_A$ and $V_B$ which are supplied to the coils 14 and the coils 13, respectively. In this case, the excitation circuit 32 varies the voltages $V_A$ and $V_B$ in accordance with the voltage of the signal SA to thereby control the magnitude of excitation of each of the coils 14 and 13. More specifically, the excitation circuit 32 controls the levels of the voltages $V_A$ and $V_B$ in such a manner that the voltage of the signal SA becomes equal to "0". For example, when the voltage of the signal SA is equal to $+V_1$, the excitation circuit 32 renders the voltage $V_A$ greater than the voltage $V_B$. When the voltage of the signal SA is equal to $-V_1$, the excitation circuit 30b renders the voltage $V_A$ smaller than the voltage $V_B$.

And, when the voltage of the signal SA is equal to "0", the excitation circuit 30b renders the voltage $V_A$ equal to the voltage $V_B$.

In operation, the carriage 3 traveling on the rollers 2 along the track T at a high speed in the forward direction indicated by the arrow A in FIG. 5 is braked by a traveling magnetic field produced by the stator 5b in the reverse direction indicated by the arrow B, and approaches at a decreased speed the predetermined stop position shown in FIG. 5 where the reference position $P_0$ on the carriage 3 comes just above the reference point $G_0$ on the floor. Then, when the approach of the carriage 3 to the stop position is detected by means of a limit switch (not shown), the stator 5b is de-energized. Then, when the photosensor unit 22a detects the light reflected by the reflector plate 21a and beings to output the A-phase pulse train AP to the excitation control circuit 30, the control circuit 31 outputs the pulse signal ST to the reset terminal R of the reversible counter 26 to reset it, and at the same time the excitation circuit 32 begins to excite the coils 14 and 13. Thus, the positioning of the carriage 3 by the positioning apparatus is commenced. Thereafter, the photosensor units 22a and 22b detect the movement of the carriage 3, and the excitation circuit 32 controls the magnitude of excitation of each of the coils 14 and 13. As a result, the cores 10 and 11 attract the yoke 15 under the control of the excitation control circuit 30 so that the carriage 3 is positioned at the stop position where the reference point $P_0$ on the carriage 3 comes just above the reference point $G_0$ on the floor.

A modified positioning apparatus according to the present invention will now be described with reference to FIGS. 8 and 9 wherein only main portions of the apparatus are shown.

This modified apparatus differs from the apparatus shown in FIGS. 4 to 6 in the following respects. The carriage 3 is provided at its lower surface with a pair of elongated permanent magnets 40 and 40 which are spaced by a predetermined distance from each other transversely of the carriage 3. A pair of magnetic cores 41 and 41 of a U-shaped cross-section are fixedly mounted on the floor through support members 42 with leg portions thereof extending upward, the leg portions being spaced from each other along the track T. The magnetic cores 41 are spaced by the same distance as the permanent magnets 40 transversely of the carriage 3. An induction coil 43 is wound around a base portion of each of the cores 41. An excitation control circuit 30a comprises a control circuit 31a of the same construction as the control circuit 31 of FIG. 6 and an excitation circuit 32a. The excitation circuit 32a is rendered operative by the control circuit 31a and outputs to the coil 43 a drive signal D of which polarity is changed in accordance with the voltage of the signal SA. For example, the voltage of the drive signal D is rendered equal to a predetermined positive value $V_C$ when the voltage of the signal SA is positive, while the voltage of the signal D is rendered equal to a predetermined negative value $-V_C$ when the voltage of the signal SA is negative. Thus, the direction of magnetization of each of the cores 41 is controlled so that the carriage 3 stops at the predetermined position.

What is claimed is:

1. In an automatic transportation system having a carriage, a track provided on a floor and including predetermined stop zones of the carriage, drive means for driving the carriage to travel along the track and a positioning apparatus for positioning the carriage at a predetermine stop position within a selected one of the stop zones, the positioning apparatus comprising:

at least a pair of magnetic cores mounted on the floor and spaced from each other in a direction of traveling of the carriage and induction coils respectively wound around said magnetic cores for producing a magnetic field through said magnetic cores; at least one yoke of a magnetic material, said yoke being mounted on the carriage at such a position that said magnetic field generated by said first magnetic device means passes therethrough;

detector means for detecting a deviation of the carriage from the predetermined stop position within the stop zones to output a detection signal representative of the detected deviation; and control circuit means responsive to said detection signal for causing said first magnetic device means to vary the magnetic field so as to move the carriage along the track in such a direction that the deviation reaches zero.

2. A positioning apparatus according to claim 1, wherein said detector means comprises a plurality of reflection members mounted on the carriage and equally spaced from one another by a predetermined distance in the direction of traveling of the carriage and a pair of reflection-type photosensors mounted on the floor within the stop zone in such a manner that said photosensor detects said reflection members to output a pair of pulse trains a predetermined angle out of phase from each other when the carriage passes the stop position.

3. A positioning apparatus according to claim 2, wherein said control circuit means comprises a direction determination circuit for determining the direction of traveling of the carriage in accordance with a phase difference between said pair of pulse trains to output one of said pulse trains determined by the determination result, a reversible counter for up-counting pulses of the pulse train from said determination circuit when the carriage travels in one direction and for down-counting pulses of the pulse train from said determination circuit when the carriage travels in the other direction, and excitation means for exciting said first magnetic device means so that said magnetic field is varied in accordance with a count output of said reversible counter.

4. A positioning apparatus according to claim 3, wherein said excitation means comprises means for providing a reference numerical value, subtractor means for subtracting said reference numerical value from said count output of said reversible counter to output a subtraction result, digital-to-analog converter means for converting said subtraction result into an analog signal, and an excitation circuit for exciting said first magnetic device in accordance with said analog signal.

5. A positioning apparatus according to claim 1, wherein said first magnetic device means comprises at least one magnetic core mounted on the floor in such a manner that a pair of pole portions thereof are spaced from each other in the direction of traveling of the carriage and an induction coil wound around said magnetic core for producing said magnetic field between said pair of pole portions, said second magnetic device means comprising at least one permanent magnet mounted on the carriage with a pair of poles thereof being spaced from each other in the direction of traveling of the carriage, said permanent magnet being mounted on the carriage at such a position that said permanent magnet is disposed within said magnetic field generated by said first magnetic device means when the carriage is within the stop zone.

6. In an automatic transportation system having a carriage, a track provided on a floor and including predetermined stop zones of the carriage, drives means for driving the carriage to travel along the track and a positioning apparatus for positioning within a selected one of the stop zones, the positioning apparatus comprising:

first magnetic device means mounted on the floor at a predetermined position of each of the stop zones for generating a variable magnetic field;

second magnetic device means mounted on the carriage and driven by the magnetic field generated by said first magnetic device means to move the carriage along the track in the direction determined by the magnetic field when the carriage is disposed within a selected one of the stop zones;

a plurality of reflection members mounted on the carriage and equally spaced from one another by a predetermined distance in the direction of traveling of the carriage and a pair of reflection-type photosensors mounted on the floor within the stop zone in such a manner that said photosensor detects said reflection members to output a pair of pulse trains a predetermined angle out of phase from each other when the carriage passes the stop position so as to detect a deviation of the carriage from the predetermined stop position within the stop zones, and output detection signals representative of the detected deviation;

a direction determination circuit for determining the direction of traveling of the carriage in accordance with a phase difference between said pair of pulse trains to output one of said pulse trains determined by the determination result;

a reversible counter for up-counting pulses of the pulse train from said direction determination circuit when the carriage travels in one direction and for down-counting pulses of the pulse train from said determination circuit when the carriage travels in the other direction;

means for providing a reference numerical value representing a predetermined stop position;

subtractor means for subtracting said reference numerical value from said count output of said reversible counter to output a subtraction result;

digital-to-analog converter means for converting said subtraction result into an analog signal; and an excitation circuit for exciting said first magnetic device in accordance with said analog signal.

* * * * *

UNITED STATES PATENT AND TRADEMARK OFFICE
CERTIFICATE OF CORRECTION

PATENT NO. : 4,700,119

DATED : October 13, 1987

INVENTOR(S) : Mitsuji Karita

It is certified that error appears in the above-identified patent and that said Letters Patent is hereby corrected as shown below:

Column 2, line 49, change "components" to --component--.

Column 3, line 34, change "paratusk" to --paratus--.

Column 3, line 36, after "FIG" insert --8--.

Column 4, line 37, change "surface" to --surfaces--.

Column 4, line 56, change "cariage" to --carriage--.

Column 4, line 55, change "than" to --from--.

In the Claims:

Column 7, line 2, change "predetermine" to --predetermined--.

Column 7, line 49, change "subtractor" to --subtracter--.

Column 8, line 54, change "subtractor" to --subtracter--.

Signed and Sealed this

Ninth Day of August, 1988

*Attest:*

DONALD J. QUIGG

*Attesting Officer*     *Commissioner of Patents and Trademarks*